(12) United States Patent
Mohr et al.

(10) Patent No.: US 11,303,363 B1
(45) Date of Patent: Apr. 12, 2022

(54) METHOD AND APPARATUS FOR SYMBOL-ERROR-RATE (SER) BASED TUNING OF TRANSMITTERS AND RECEIVERS

(71) Applicant: Mellanox Technologies, Ltd., Yokneam (IL)

(72) Inventors: Johan Jacob Mohr, Copenhagen (DK); Bjarke Vad Pedersen, Roskilde (DK); Benny Christensen, Frederikssund (DK)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 17/068,442

(22) Filed: Oct. 12, 2020

(51) Int. Cl.
*H04B 14/02* (2006.01)
*H04L 1/24* (2006.01)
*H04L 1/00* (2006.01)

(52) U.S. Cl.
CPC .............. *H04B 14/023* (2013.01); *H04L 1/00* (2013.01); *H04L 1/242* (2013.01)

(58) Field of Classification Search
CPC .......... H04L 1/242; H04L 1/00; H04B 14/023
See application file for complete search history.

(56) References Cited

U.S. PATENT DOCUMENTS

| | | | | |
|---|---|---|---|---|
| 7,218,670 B1 * | 5/2007 | Lesea | .................. | H04B 17/364 370/509 |
| 7,369,339 B2 * | 5/2008 | Kojima | .................. | G11B 19/04 360/31 |
| 8,862,177 B2 * | 10/2014 | Zhu | .................. | H04W 52/386 455/522 |
| 9,218,240 B2 * | 12/2015 | Chambers | .............. | H04L 1/0045 |
| 9,419,746 B1 * | 8/2016 | Baeckler | .............. | H04L 25/0264 |
| 9,755,792 B1 * | 9/2017 | Lin | .................. | G06F 7/582 |
| 10,222,415 B2 * | 3/2019 | Kumar | ............... | G01R 31/3193 |
| 2005/0071399 A1 * | 3/2005 | Bonaccio | .......... | G01R 31/31703 708/250 |
| 2013/0086439 A1 * | 4/2013 | Xia | ......................... | G11B 27/36 714/704 |
| 2015/0063828 A1 * | 3/2015 | Bliss | ................. | H04L 25/03343 398/189 |
| 2015/0089332 A1 * | 3/2015 | Chambers | ......... | H03M 13/6306 714/807 |
| 2017/0163800 A1 * | 6/2017 | Wang | .................. | H04M 3/2218 |
| 2019/0258888 A1 * | 8/2019 | Garrido | .................. | G06K 9/348 |

* cited by examiner

*Primary Examiner* — Jean B Corrielus
(74) *Attorney, Agent, or Firm* — Alston & Bird LLP

(57) ABSTRACT

Embodiments are disclosed for a sequence selective symbol checker for communication systems. An example method includes configuring a symbol checker of a receiver with first binary sequence data generated by a symbol generator of the receiver. The example method also includes comparing, using the symbol checker, second binary sequence data provided by a transmitter to the first binary sequence data to generate error count data related to a number of errors for symbols associated with the second binary sequence data. The example method also includes determining total count data related to a number of symbols associated with the first binary sequence data. The example method also includes determining error ratio data associated with the transmitter based on the error count data and the total count data.

23 Claims, 7 Drawing Sheets

METHOD AND APPARATUS FOR SYMBOL-ERROR-RATE (SER) BASED TUNING OF TRANSMITTERS AND RECEIVERS

TECHNOLOGICAL FIELD

Embodiments of the present invention relate generally to a method and apparatus for symbol-error-rate based tuning of transmitters and receivers.

BACKGROUND

Communication systems are generally composed of a transmitter, a receiver, and a channel. The transmitter generates a signal conveying information, which, after being transmitted over a channel, is received and recovered at the receiver. Information in the form of symbols embedded in the signal is generally set by the transmitter, and the symbol frequency, symbol phase, and symbol timing may be recovered by the receiver. Furthermore, communication systems often employ modulation to vary properties of a signal being transmitted by a transmitter. A common type of modulation is pulse-amplitude-modulation (PAM) that encodes information via an amplitude of a signal.

In a Pulse-Amplitude-Modulated, n-Level, (PAMn) optical or electrical signaling system, the transmitter generally employs equalization to provide an optimal Signal-to-Noise Ratio (SNR) for a receiver connected to an output of the transmitter. Generally, the equalization is achieved by employing a linear Feed-Forward Equalizer (FFE) such as, for example, a Finite Impulse Response (FIR) filter, to tune the signal. Techniques for tuning are often based on identification of a certain symbol sequence associated with a signal. For example, tuning can be based on identification of three consecutive symbols with certain values (e.g., a triplet). As such, sampled values associated with the symbol sequence (e.g., the triplet) can then be employed as a metric for tuning the transmitter. However, with this approach, noise associated with the signal is averaged out and the noise is not factored in for the equalization. As such, employing signal levels as a metric for tuning a transmitter is generally not an optimal technique for tuning the transmitter.

BRIEF SUMMARY

Example embodiments of the present invention relate generally to a method and apparatus for symbol-error-rate based tuning of transmitters and receivers. According to one or more embodiments, a method and apparatus for a symbol checker for communication systems is provided. In an embodiment, a method and apparatus for a sequence selective pseudorandom binary sequence (PRBS) checker for communication systems is provided. In another embodiment, a method and apparatus for a sequence selective Short Stress Pattern Random Quaternary (SSPRQ) checker for communication systems is provided. The details of some embodiments of the subject matter described in this specification are set forth in the accompanying drawings and the description below. Other features, aspects, and advantages of the subject matter will become apparent from the description, the drawings, and the claims.

In an embodiment, a method for tuning based on symbol-error-rate is provided. The method includes configuring a symbol checker of a receiver with first binary sequence data generated by a symbol generator of the receiver. The method further includes comparing, using the symbol checker, second binary sequence data provided by a transmitter to the first binary sequence data to generate error count data related to a number of errors for symbols associated with the second binary sequence data. The method further includes determining total count data related to a number of symbols associated with the first binary sequence data. Furthermore, the method includes determining error ratio data associated with the transmitter based on the error count data and the total count data.

In some embodiments, comparing the second binary sequence data to the first binary sequence data includes comparing symbols of the second binary sequence data to symbols of the first binary sequence data using the symbol checker. In some embodiments, the method further includes tuning the transmitter based on the error ratio data. In some embodiments, the method further includes tuning a look-up table of the transmitter based on the error ratio data. In some embodiments, the method further includes repeatedly tuning the transmitter in response to a determination that the error ratio data satisfies a defined criterion.

In some embodiments, the method further includes determining a number of error types for the symbol checker based on a type of coding for the second binary sequence data. In some embodiments, the method further includes synchronizing the first binary sequence data to the second binary sequence data based on a type of coding for the second binary sequence data.

In some embodiments, determining the total count data comprises monitoring at least a current symbol of the first binary sequence data, a previous symbol of the first binary sequence data, and a future symbol of the first binary sequence data. In some embodiments, the first binary sequence data corresponds to an expected binary sequence for the second binary sequence data. In some embodiments, the error ratio data corresponds to a symbol-error-rate for the second binary sequence data. In some embodiments, the second binary sequence data is a pulse amplitude modulation signal. In some embodiments, the transmitter is a non-linear optical transmitter or a non-linear electrical transmitter.

In another embodiment, an apparatus in a receiver comprises at least one processor and at least one memory including computer program code. The at least one memory and the computer program code are configured to, with the at least one processor: configure a symbol checker of a receiver with first binary sequence data generated by a symbol generator of the receiver, compare second binary sequence data provided by a transmitter to the first binary sequence data based on the symbol checker to generate error count data related to a number of errors for symbols associated with the second binary sequence data, determine total count data related to a number of symbols associated with the first binary sequence data, and determine error ratio data associated with the transmitter based on the error count data and the total count data.

In some embodiments, the at least one memory and the computer program code are further configured to compare symbols of the second binary sequence data to symbols of the first binary sequence data using the symbol checker. In some embodiments, the at least one memory and the computer program code are further configured to tune the transmitter based on the error ratio data. In some embodiments, the at least one memory and the computer program code are further configured to tune a look-up table of the transmitter based on the error ratio data.

In some embodiments, the at least one memory and the computer program code are further configured to determine a number of error types for the symbol checker based on a type of coding for the second binary sequence data. In some embodiments, the at least one memory and the computer program code are further configured to synchronize the first binary sequence data to the second binary sequence data based on a type of coding for the second binary sequence data. In some embodiments, the second binary sequence data is a pulse amplitude modulation signal. In some embodiments, the transmitter is a non-linear optical transmitter or a non-linear electrical transmitter.

In yet another embodiment, an apparatus in a receiver comprises hardware logic circuitry. The hardware logic circuitry is configured to configure a symbol checker of a receiver with first binary sequence data generated by a symbol generator of the receiver. The hardware logic circuitry is further configured to compare, based on the symbol checker, second binary sequence data provided by a transmitter to the first binary sequence data to generate error count data related to a number of errors for symbols associated with the second binary sequence data. The hardware logic circuitry is further configured to determine total count data related to a number of symbols associated with the first binary sequence data. The hardware logic circuitry is further configured to determine error ratio data associated with the transmitter based on the error count data and the total count data.

The above summary is provided merely for purposes of summarizing some example embodiments to provide a basic understanding of some aspects of the present invention. Accordingly, it will be appreciated that the above-described embodiments are merely examples and should not be construed to narrow the scope or spirit of the present invention in any way. It will be appreciated that the scope of the present invention encompasses many potential embodiments in addition to those here summarized, some of which will be further described below.

BRIEF DESCRIPTION OF THE DRAWINGS

Figure 1:
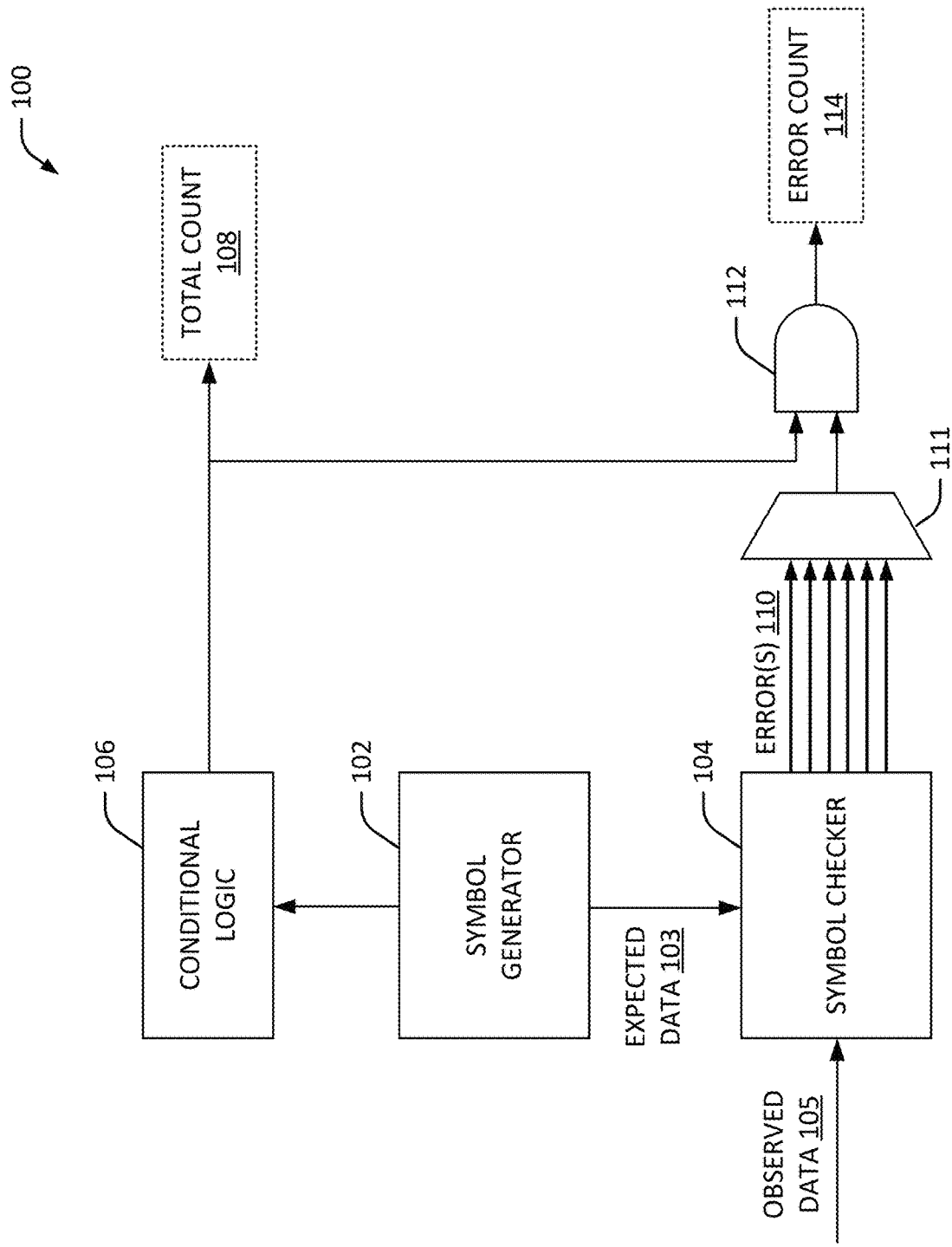
Figure 2:
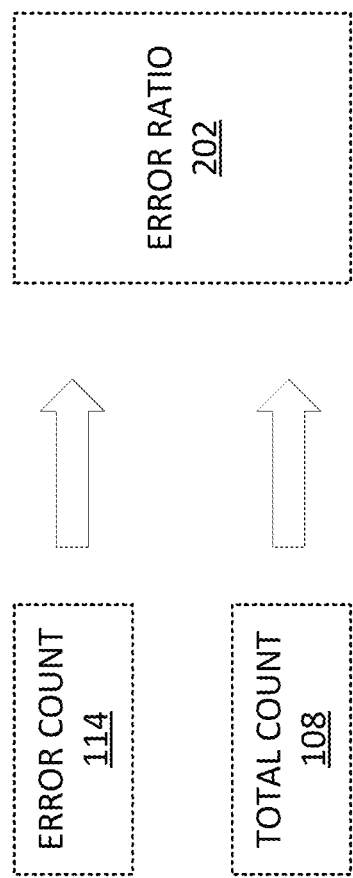
Figure 3:
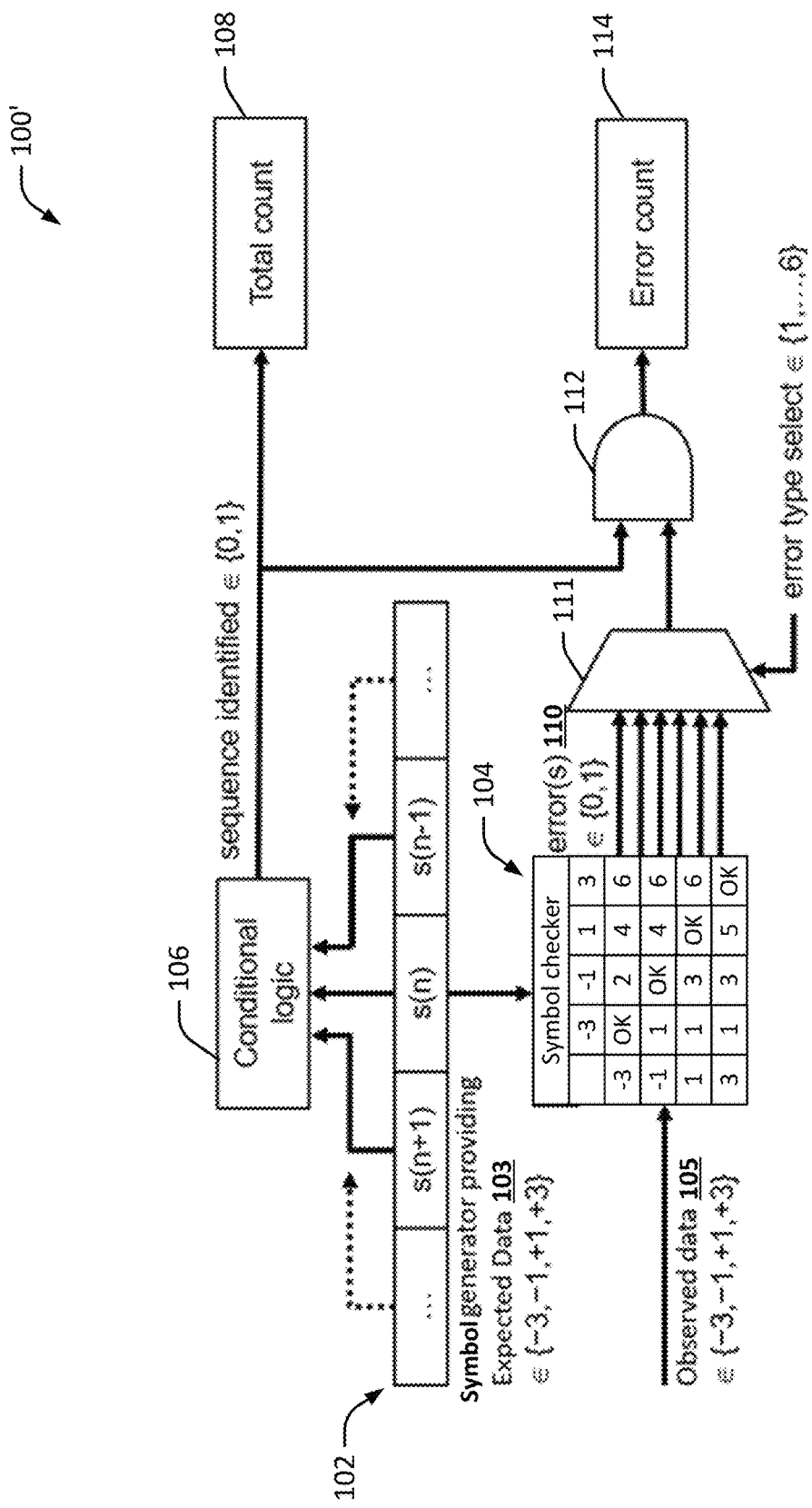
Figure 4:
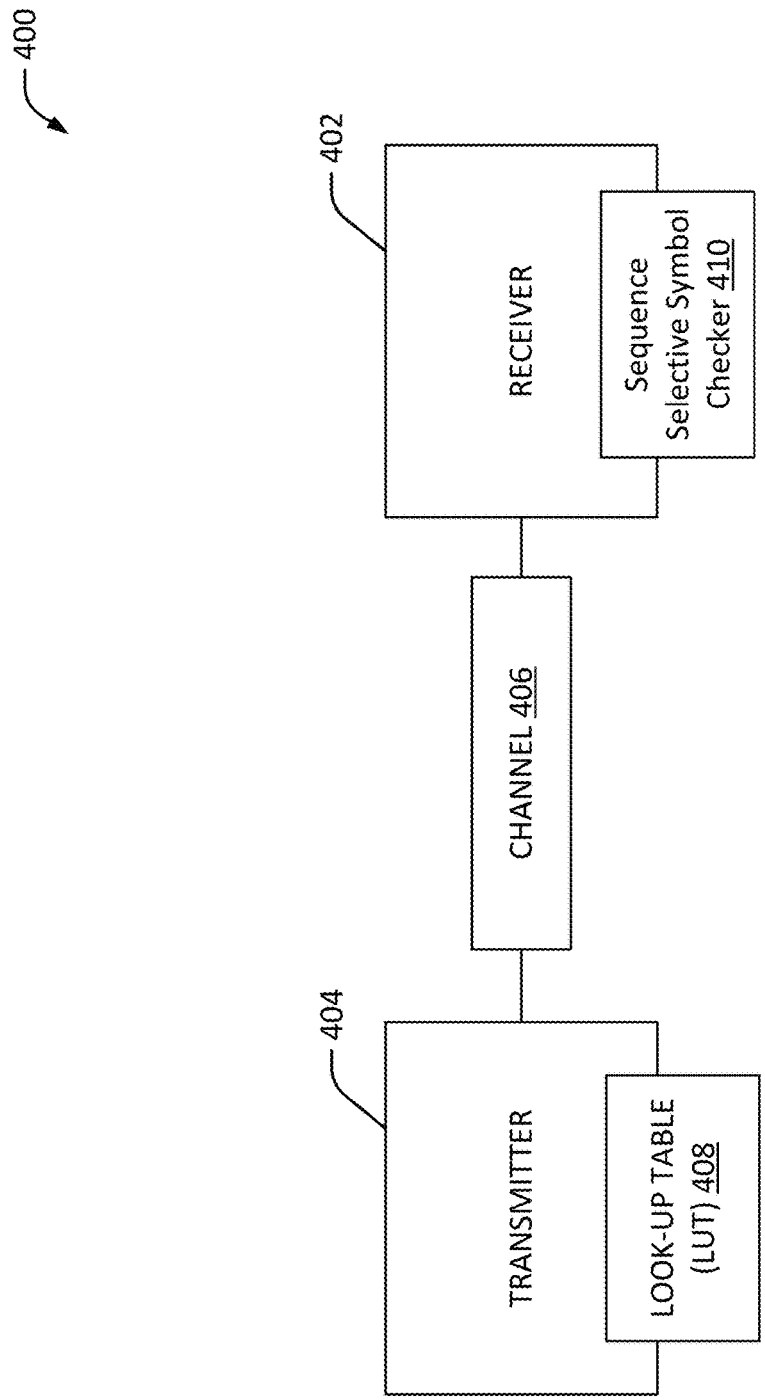
Figure 5:
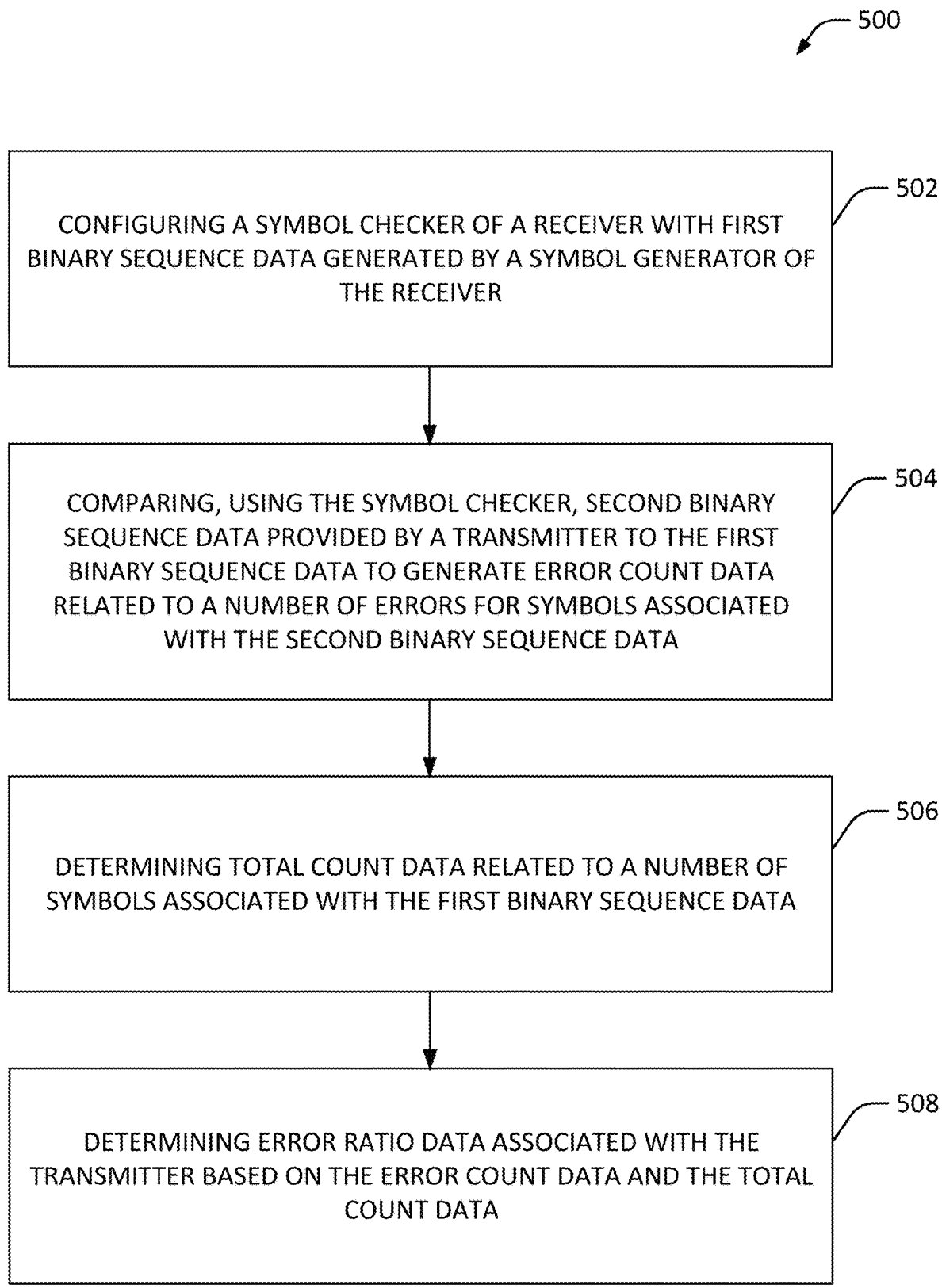
Figure 6:
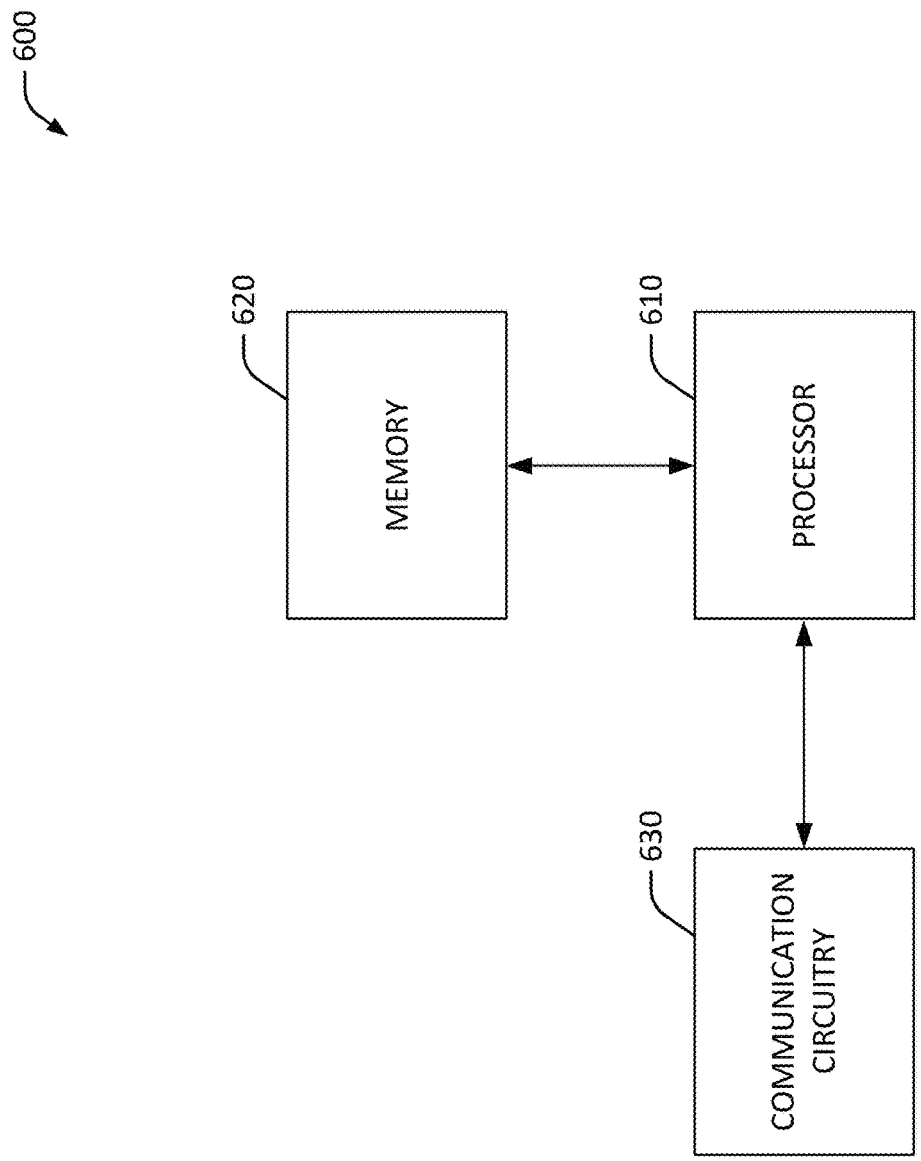
Figure 7:
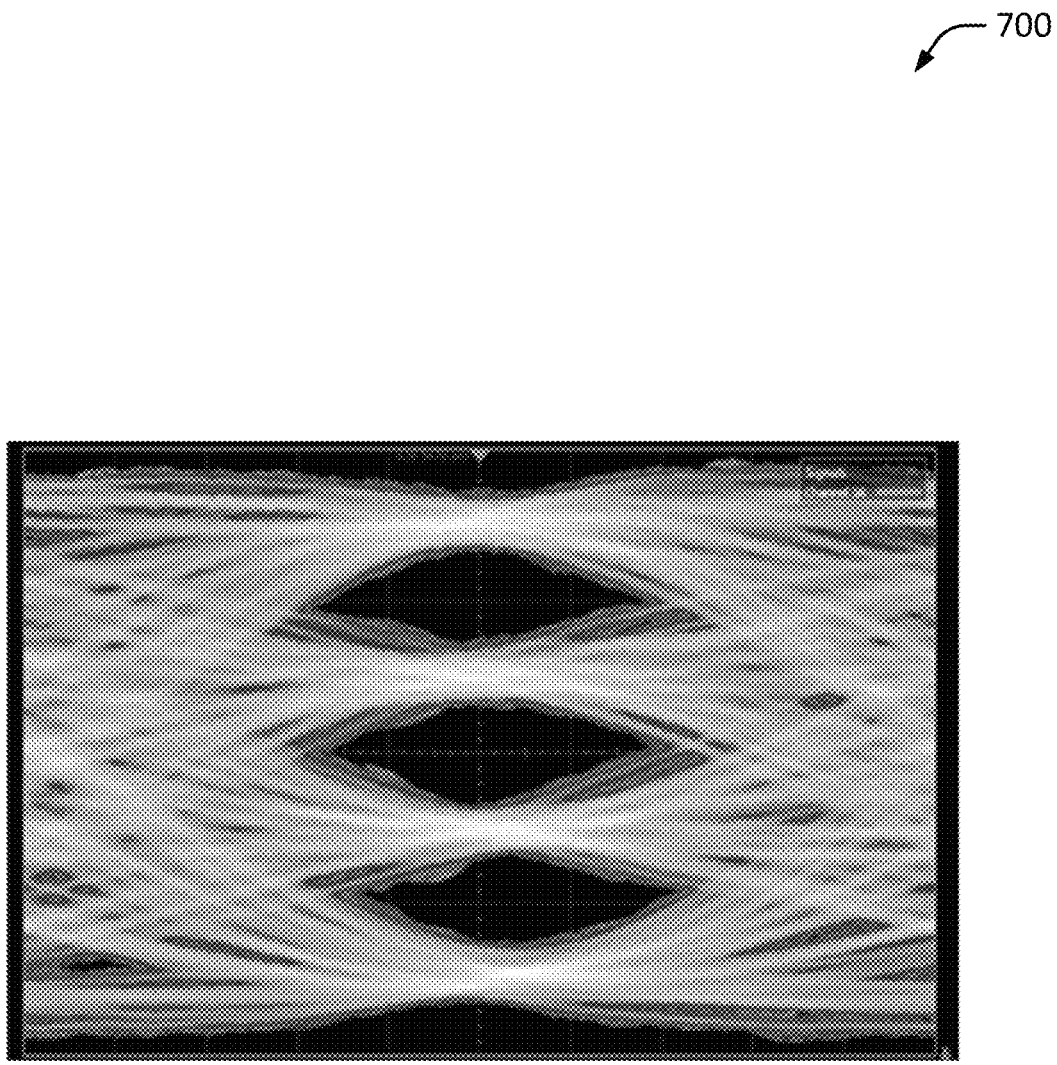

Having thus described the disclosure in general terms, reference will now be made to the accompanying drawings, which are not necessarily drawn to scale, and wherein:

FIG. 1 illustrates an exemplary system associated with a sequence selective pseudorandom binary sequence checker, in accordance with one or more embodiments of the present disclosure;

FIG. 2 illustrates an exemplary error ratio generated based on an error count and a total count, in accordance with one or more embodiments of the present disclosure;

FIG. 3 illustrates another exemplary system associated with a sequence selective pseudorandom binary sequence checker, in accordance with one or more embodiments of the present disclosure;

FIG. 4 illustrates an exemplary communications system associated with a sequence selective pseudorandom binary sequence checker, in accordance with one or more embodiments of the present disclosure;

FIG. 5 is a flowchart illustrating an example method for tuning a transmitter based on symbol-error-rate, in accordance with one or more embodiments of the present disclosure;

FIG. 6 illustrates an example computing system that may be embedded in the communication system, in accordance with one or more embodiments of the present disclosure; and FIG. 7 illustrates an example eye diagram related to one or more embodiments disclosed herein.

DETAILED DESCRIPTION

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "exemplary" and "example" as may be used herein are not provided to convey any qualitative assessment, but instead merely to convey an illustration of an example. Thus, use of any such terms should not be taken to limit the spirit and scope of embodiments of the present invention.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Communication systems are generally composed of a transmitter, a receiver, and a channel. The transmitter generates a signal conveying information, which, after being transmitted over a channel, is received and recovered at the receiver. Furthermore, communication systems often employ modulation to vary properties of a signal being transmitted by a transmitter. A common type of modulation is pulse-amplitude-modulation (PAM) that encodes information via an amplitude of a signal. For optical based communications such as communications using vertical cavity surface emitting lasers (VCSELs), electro-absorption modulated lasers (EMLs), or directly modulated lasers (DMLs), the lasers are nonlinear laser sources. Further, nonlinearities can be introduced in the transmission process because of reflections or the like.

In a Pulse-Amplitude-Modulated, n-Level, (PAMn) optical or electrical signaling system, the transmitter generally employs equalization to provide an optimal Signal-to-Noise Ratio (SNR) for a receiver connected to an output of the transmitter. Generally, the equalization is achieved by employing a linear Feed-Forward Equalizer (FFE) such as, for example, a Finite Impulse Response (FIR) filter, to tune the signal. However, when the nonlinear laser sources are used to transmit optical signals via a nonlinear channel to encode information in different amplitude levels (such as pulse amplitude modulation-4, "PAM-4"), the integrity of the communication can be compromised.

With non-linear transmitters, and in particularly highly non-linear optical transmitters, non-linear transmitter equalization is beneficial. Generally, this can be achieved by employing a Look-Up-Table (LUT) based transmitter that includes an output-stage with a Digital-to-Analog Converter (DAC). The DAC can be controlled, for example, by a sequence of symbols such as a transmit symbol, a number of previous symbols and/or number of future symbols. In an example, a PAM-4 can employ three consecutive symbols similar to a 3-tap FFE. The conventional linear FFE will have 3 degrees of freedom, whereas an LUT based transmitter implementation will have 64 degrees of freedom (e.g., $4^3$ degrees of freedom). This allows for compensation of non-linear effects, but also increases complexity of tuning the transmitter.

Techniques for tuning a transmitter are often based on identification of a certain symbol sequence associated with a signal. For example, tuning can be based on identification of three consecutive symbols with certain values (e.g., a triplet). As such, sampled values associated with the symbol sequence (e.g., the triplet) can then be employed as a metric for tuning the transmitter. However, with this approach, noise associated with the signal is averaged out and the noise is not factored in for the equalization. As such, employing signal levels as a metric for tuning a transmitter is generally not an optimal technique for tuning the transmitter.

Thus, to address these and/or other issues, symbol-error-rate (SER) based tuning of transmitters and receivers is disclosed herein. According to one or more embodiments, a symbol checker for communication systems is provided. For instance, in an embodiment, a sequence selective pseudo-random binary sequence (PRBS) checker for communication systems is provided. The sequence selective PRBS checker disclosed herein employs SER as a metric for tuning a transmitter. In one or more embodiments, the sequence selective PRBS checker employs SER as a metric for tuning a transmitter LUT in a non-linear optical transmitter. According to one or more embodiments, the sequence selective PRBS checker identifies symbol errors based on a comparison to symbols from a PRBS generator in a receiver synchronized to an incoming signal. In an embodiment, output of the PRBS generator is employed to select one or more desired symbol sequences. Furthermore, an error count for the selected one or more desired symbol sequences can be determined. In another embodiment, a sequence selective Short Stress Pattern Random Quaternary (SSPRQ) checker for communication systems is provided. The sequence selective SSPRQ checker disclosed herein employs SER as a metric for tuning a transmitter. In one or more embodiments, the sequence selective SSPRQ checker disclosed herein employs SER as a metric for tuning a transmitter LUT in a non-linear optical transmitter. According to one or more embodiments, the sequence selective SSPRQ checker disclosed herein identifies symbol errors based on a comparison to symbols from an SSPRQ generator in a receiver synchronized to an incoming signal. In an embodiment, output of the SSPRQ generator is employed to select one or more desired symbol sequences. Furthermore, an error count for the selected one or more desired symbol sequences can be determined.

In an example embodiment, an observed data stream (e.g., a recovered data stream) can be a sequence of four numbers. Furthermore, the observed data stream can be compared to a copy of sent symbols. In one or more embodiments, the sent symbols can be modulated by a modulation technique in the transmitter. In addition, the receiver can include a demodulator and/or a decision circuit that can be employed to recover the sent symbols based on a received analog signal (e.g., a received analog signal that includes a sequence of four numbers). As such, symbol errors can be employed instead of signal levels for tuning of the transmitter, the receiver, and/or another device in a communications system. Additionally, it is to be appreciated that, in certain embodiments, another type of symbol checker (e.g., a sequence selective symbol checker) can alternatively be employed by a communication system. For example, in certain embodiments, a sequence selective symbol checker associated with another type of symbol stream can employ symbol errors instead of signal levels for tuning of a transmitter and/or a receiver using similar techniques as the sequence selective PRBS checker and/or the sequence selective SSPRQ disclosed herein.

As compared to conventional transmitters and receivers, embodiments of the sequence selective symbol checker disclosed herein provide for individual consideration of selected symbol sequences such that a measurement of overall SER does not mask results from the selected symbol sequences. For example, a symbol sequence generator can synchronize to a received data stream to facilitate symbol by symbol comparison with respect to all symbols of a symbol sequence. Embodiments of the sequence selective symbol checker disclosed herein also provide for more robust identification of symbol sequences from a synchronized symbol sequence generator. Furthermore, embodiments of the sequence selective symbol checker disclosed herein provide for measurements with higher SER.

FIG. 1 illustrates a system 100 that provides a sequence selective symbol checker according to one or more embodiments of the present disclosure. For instance, in an embodiment, the system 100 corresponds to a sequence selective PRBS checker. In another embodiment, the system 100 corresponds to a sequence selective SSPRQ checker. In some embodiments, one or more components of the system 100 may be embedded within a receiver. The system 100 includes a symbol generator 102 and a symbol checker 104. In one or more embodiments, the symbol generator 102 can be configured to replicate a transmitted data stream and the symbol checker 104 can be configured to synchronize a received data stream to the replicated data stream. In an embodiment, the symbol generator 102 is a PRBS generator and the symbol checker 104 is a PRBS checker configured for PRBS sequences. In an embodiment, the symbol generator 102 is an SSPRQ generator and the symbol checker 104 is an SSPRQ checker configured for SSPRQ sequences. However, it is to be appreciated that, in certain embodiments, the symbol generator 102 and/or the symbol checker 104 can be configured for a different type of symbol stream.

The symbol generator 102 provides expected data 103 to the symbol checker 104. In addition to receiving the expected data 103, the symbol checker 104 also receives observed data 105. The symbol checker 104 can be, for example, a detector configured for symbol sequences. In an embodiment, the symbol sequence is a PRBS sequence. In another embodiment, the symbol sequence is an SSPRQ sequence. The expected data 103 can include, for example, a set of symbols provided by the symbol generator 102. For instance, the expected data 103 can be a binary sequence (e.g., first binary sequence data) generated by the symbol generator 102. The observed data 105 can be a binary sequence (e.g., second binary sequence data) provided by a transmitter. For example, the observed data 105 can include, for example, a set of decoded symbols associated with the transmitter. In an embodiment, the expected data 103 and the observed data 105 can be associated with PRBS sequences. In another embodiment, the expected data 103 and the observed data 105 can be associated with SSPRQ sequences. However, it is to be appreciated that, in certain embodiments, the expected data 103 and the observed data 105 can be associated with a different type of symbol stream. In one example, the observed data 105 can be a pulse amplitude modulation signal. In an embodiment, the observed data 105 can be received by the transmitter. In another embodiment, the observed data 105 can be received by a decision circuit of the receiver that determines (e.g., based on a threshold value) whether an incoming binary signal from the transmitter is a logical "0" value or a logical "1" value. In one or more embodiments, the symbol generator 102 can be synchronized with the observed data 105. In one or more embodiments, the symbol generator 102 can be synchronized with the observed data 105 based on a type of coding for the observed data 105.

In one or more embodiments, the system 100 also includes conditional logic 106. The conditional logic 106 can select one or more symbol sequences from the expected data 103. For instance, the conditional logic 106 can receive information regarding one or more previous symbols, one or more current symbols, and/or one or more next symbols associated with the expected data 103. In an embodiment, an output of the conditional logic 106 can be provided as data for a total count 108. For example, a sequence identified output of the conditional logic 106 can be provided as data for the total count 108. As such, the total count 108 can be total count data related to a number of symbols associated with the expected data 103.

In an embodiment, the one or more symbol sequences selected from the expected data 103 can also be employed for counting of errors associated with the observed data 105. For instance, the symbol checker 104 can be employed to compare the observed data 105 to the expected data 103 to determine one or more errors 110 associated with the observed data 105. In one or more embodiments, the one or more errors 110 can be provided to a multiplexer 111. The multiplexer 111 can provide an indication of an error to a logic gate 112. The logic gate 112 can be, for example, an AND logic gate. Furthermore, the logic gate 112 can receive the indication of the error (e.g., provided by the multiplexer 111) and an indication of a symbol sequence (e.g., provided by the conditional logic 106). Based on the indication of the error (e.g., provided by the multiplexer 111) and the indication of the symbol sequence (e.g., provided by the conditional logic 106), the logic gate 112 can provide data for an error count 114. As such, the error count 114 can be error count data related to a number of errors for symbols associated with the observed data 105. In one or more embodiments, the symbol generator 102, the symbol checker 104, the conditional logic 106, the multiplexer 111, and/or the logic gate 112 can be configured as computer code (e.g., firmware). Additionally or alternatively, in one or more embodiments, the symbol generator 102, the symbol checker 104, the conditional logic 106, the multiplexer 111, and/or the logic gate 112 can be configured as hardware logic (e.g., hardware logic circuitry).

In one or more embodiments, as illustrated in FIG. 2, an error ratio 202 can be determined based on the total count 108 and the error count 114. The error ratio 202 can be, for example, error ratio data associated with the transmitter. In an embodiment, the error ratio 202 can be a SER for the observed data 105. For example, the error ratio 202 can be a ratio between the error count 114 and the total count 108 where the error ratio 202 is equal to the error count 114 (e.g., a number of symbols associated with an error) divided by the total count 108 (e.g., a total number of transmitted symbols).

FIG. 3 illustrates a system 100' that provides a sequence selective symbol checker according to one or more embodiments of the present disclosure. The system 100' illustrates an exemplary embodiment associated with the system 100. Furthermore, the system 100' illustrates counting of one error type at a time such that by replicating gating and the error count 114, all errors associated with the observed data 105 can be counted in parallel. The system 100' may include the symbol generator 102, the symbol checker 104, and the conditional logic 106. In one or more embodiments, the conditional logic 106 acts as a proxy for a transmitted signal level.

To illustrate this, a symbol alphabet $\in\{-3,-1,+1,+3\}$ is shown in FIG. 3. For example, the expected data 103 can correspond to a binary sequence (e.g., s_E(n), s_E(n+1), s_E(n+2), ...) where respective bits of the binary sequence correspond to a value from the symbol alphabet $\in\{-3,-1,+1,+3\}$. Furthermore, the symbol checker 104 can be configured with the symbol alphabet $\in\{-3,-1,+1,+3\}$. For example, the symbol generator 102 can configure the symbol checker 104 with the symbol alphabet $\in\{-3,-1,+1,+3\}$. In this regard, the symbol checker 104 can employ the symbol alphabet $\in\{-3,-1,+1,+3\}$ to compare to the observed data 105. As illustrated in FIG. 3, the observed data 105 can correspond to a binary sequence (e.g., s_O(n), s_O(n+1), s_O(n+2), ...) where respective bits of the binary sequence correspond to a value from the symbol alphabet $\in\{-3,-1,+1,+3\}$ that such respective bits from the binary sequence are compared to the binary sequence $\in\{-3,-1,+1,+3\}$ associated with the symbol checker 104. The symbol alphabet $\in\{-3,-1,+1,+3\}$ implies that coding (e.g., Costa precoding, Tomlinson-Harashima precoding, Gray coding, or the like), polarity reversal, a decision-feedback equalizer (DFE) and/or one or more other bit manipulations is applied before data is provided to the symbol generator 102. As such, in one or more embodiments, coding (e.g., Costa precoding, Tomlinson-Harashima precoding, Gray coding, or the like), polarity reversal, a decision-feedback equalizer (DFE) and/or one or more other bit manipulations can be re-applied to the data before being provided to the symbol checker 104.

In an embodiment, the conditional logic 106 can be configured as triple conditional logic. However, it is to be appreciated that, in one or more embodiments, the conditional logic 106 can be extended to a greater number of previous symbols and/or a greater number of future symbols. Furthermore, it is to be appreciated that, in one or more embodiments, the conditional logic 106 can be associated with a lesser number of previous symbols and/or a lesser number of future symbols. For example, in one or more embodiments, the conditional logic 106 can identify one out of the possible sequences. However, in one or more other embodiments, the conditional logic 106 can be extended so that more triplets (or, in general, sequences) are identified. In an embodiment, the conditional logic 106 can monitor a current bit value (e.g., s(n)) of the expected data 103, a previous bit value (e.g., s(n−1)) of the expected data 103, and/or a future bit value (e.g., s(n+1)) of the expected data 103 to facilitate identifying one or more symbol sequences for the total count 108. In an example, a sequence identified output of the conditional logic 106 can be provided as a sequence identified from $\in\{0,1\}$.

In one or more embodiments, the symbol checker 104 can employ one or more types of errors to facilitate the comparison of the binary sequence associated with the expected data 103 and the binary sequence associated with the observed data 105. For example, in an exemplary embodiment, the symbol checker 104 can employ a first error type, a second error type, a third error type, a fourth error type, a fifth error type, and/or a sixth error type to facilitate the comparison of the binary sequence associated with the expected data 103 and the binary sequence associated with the observed data 105. In another example associated with PAM-4, the one or more types of errors can include 12 error types. The example system 100' shown in FIG. 3 employs error type selected from $\in\{1, \ldots, 6\}$. Based on the comparison of the binary sequence associated with the expected data 103 and the binary sequence associated with the observed data 105, the one or more errors 110 can be configured as a non-error (e.g., a "0" binary value) or an error (e.g., a "1" binary value). However, it is to be appreciated that a different number of error types can be employed to facilitate the comparison of the binary sequence associated with the expected data 103 and the binary sequence associated with the observed data 105. In certain embodiments, a number of error types for the symbol checker 104 can be determined based on a type of coding for the observed data 105. For example, a first number of error types can be employed by the symbol checker 104 in response to a determination that the observed data 105 is associated with a first type of coding (e.g., PAM-4), a second number of error types can be employed by the symbol checker 104 in response to a determination that the observed data 105 is associated with a second type of coding (e.g., Gray coding), etc. As such, in one or more embodiments, different symbol error types can be generated and/or employed by the symbol checker 104.

In an example, respective bit values of the observed data 105 that corresponds to a binary sequence s_O(n), s_O(n+1), s_O(n+2), . . . can be compared to respective bit values of the expected data 103 that corresponds to the binary sequence s_E(n), s_E(n+1), s_E(n+2), . . . . For example, for each n of the bit sequence, s_O(n) can be compared to s_E(n) to determine whether the observed data 105 is associated with an error with respect to the expected data 103. In an aspect, respective bit values of the observed data 105 can result in no errors in response to a determination that the respective bit values of the observed data 105 corresponds to an expected value from the symbol alphabet $\in\{-3,-1,+1,+3\}$. For example, respective bit values of the observed data 105 and the expected data 103 both being equal to "−3", "−1", "1" or "3" can result in no errors (e.g., "OK"). However, in an example where the observed data 105 does not correspond to the expected data 103, an error can occur. For instance, in an example where a bit value of the observed data 105 does not correspond to an expected value from the symbol alphabet $\in\{-3,-1,+1,+3\}$, an error can occur. In one example, a bit value of the observed data 105 can be larger than an expected bit value of the expected data 103. In another example, a bit value of the observed data 105 can be less than an expected bit value of the expected data 103. For example, a bit value of the observed data 105 being equal to "−1", "1" or "3" rather than an expected bit value of "−3" can correspond to a first error (e.g., a "1" error type) where the bit value of the observed data 105 is larger than the expected bit value of the expected data 103. In another example, a bit value of the observed data 105 being equal to "−3" rather than an expected bit value of "−1" can correspond to a second error (e.g., a "2" error type) where the bit value of the observed data 105 is less than the expected bit value of the expected data 103. In another example, a bit value of the observed data 105 being equal to "1" or "3" rather than an expected bit value of "−1" can correspond to a third error (e.g., a "3" error type) where the bit value of the observed data 105 is larger than the expected bit value of the expected data 103. In another example, a bit value of the observed data 105 being equal to "−3" or "−1" rather than an expected bit value of "1" can correspond to a fourth error (e.g., a "4" error type) where the bit value of the observed data 105 is less than the expected bit value of the expected data 103. In another example, a bit value of the observed data 105 being equal to "3" rather than an expected bit value of "1" can correspond to a fifth error (e.g., a "5" error type) where the bit value of the observed data 105 is greater than the expected bit value of the expected data 103. In another example, a bit value of the observed data 105 being equal to "−3", "−1" or "1" rather than an expected bit value of "3" can correspond to a sixth error (e.g., a "6" error type) where the bit value of the observed data 105 is less than the expected bit value of the expected data 103.

FIG. 4 illustrates a block diagram of an example communication system 400 according to one or more embodiments of the present disclosure. The communication system 400 includes a receiver 402 and a transmitter 404. In one or more embodiments, the transmitter 404 transmits a signal to the receiver 402 via a channel 406. The channel 406 can be, for example, a communication channel through which a signal is transmitted. In one embodiment, the channel 406 is an electrical communication channel. In another embodiment, the channel 406 is an optical communication channel. In an embodiment, the observed data 105 can be transmitted via the channel 406. For example, in an embodiment, the transmitter 404 can transmit the observed data 105 to the receiver 402 via the channel 406. The transmitter 404 is, in one or more embodiments, a non-linear transmitter. In one embodiment, the transmitter 404 is a non-linear optical transmitter. In another embodiment, the transmitter 404 is a non-linear electrical transmitter. In one or more embodiments, the transmitter 404 includes an LUT 408. For instance, in one or more embodiments, the transmitter 404 is embedded with the LUT 408. Furthermore, in one or more embodiments, the receiver 402 includes a sequence selective symbol checker 410. For instance, in one or more embodiments, the receiver 402 is embedded with the sequence selective symbol checker 410. The sequence selective symbol checker 410 can correspond to the system 100 and/or the system 100', for example. In an embodiment, the sequence selective symbol checker 410 can be a sequence selective PRBS checker. In an embodiment, the sequence selective symbol checker 410 can be a sequence selective SSPRQ checker.

The LUT 408 can be, for example, a lookup table circuit of the transmitter 404. In an aspect, the LUT 408 can be configured with a set of lookup table values that can be employed by the transmitter 404 to compensate for nonlinearities introduced in a transmission process of a signal that is transmitted via the channel 406 due to reflections, linear channel impairments, or the like associated with the channel 406. In one or more embodiments, the transmitter 404 can be tuned based on the sequence selective symbol checker 410. For instance, in one or more embodiments, the LUT 408 can be tuned based on the sequence selective symbol checker 410. In an example, the set of lookup table values of the LUT 408 can be tuned based on the sequence selective symbol checker 410. In one or more embodiments, an error ratio (e.g., the error ratio 202) determined by the sequence selective symbol checker 410 can be employed to tune the LUT 408. For example, in one or more embodiments, an error ratio (e.g., the error ratio 202) determined by the sequence selective symbol checker 410 can be employed to tune the set of lookup table values of the LUT 408. In certain embodiments, the LUT 408 can be configured to map one or more input values to an output value. In some embodiments, the LUT 408 is a hardware-based lookup table circuit embedded in the transmitter 404. For example, the LUT 408 can include one or more hardware gates, one or more hardware latches, one or more hardware relays, and/or one or more other hardware components.

In an embodiment, the set of lookup table values of the LUT 408 can be a set of initial lookup table values. In some embodiments, the set of lookup table values of the LUT 408 can be transparent. In some alternative embodiments, the set of lookup table values of the LUT 408 can be values from initial characterization of the design of the transmitter 404. In some other alternative embodiments, the set of lookup table values of the LUT 408 can be pre-defined custom values. In an embodiment, one or more lookup table values included in the set of lookup table values of the LUT 408 can be updated while tuning the LUT 408, such as after each iteration of transmitting one or more signals to the receiver 402. In one or more embodiments, the transmitter 404 (e.g., the set of lookup table values of the LUT 408) can be repeatedly tuned in response to a determination that an error ratio (e.g., the error ratio 202) determined by the sequence selective symbol checker 410 satisfies a defined criterion. In one or more embodiments, the defined criterion can be a threshold value for SER associated with the error ratio (e.g., the error ratio 202) determined by the sequence selective symbol checker 410. For example, in one or more embodiments, the transmitter 404 can be repeatedly tuned (e.g., the set of lookup table values of the LUT 408 can be repeatedly tuned) in response to a determination that an error ratio (e.g., the error ratio 202) is above a defined SER threshold value. In one or more embodiments, the transmitter 404 can be repeatedly tuned (e.g., the set of lookup table values of the LUT 408 can be repeatedly tuned) until the error ratio (e.g., the error ratio 202) determined by the sequence selective symbol checker 410 is below a defined SER threshold value. In some embodiments, the LUT 408 can be embedded in a clock-data recovery unit of the transmitter 404.

In certain embodiments, the transmitter 404 additionally includes an equalizer, a clock data recovery unit (CDR), and/or a digital to analog converter. In one or more embodiments, output of the digital to analog converter can be employed to drive a laser driver circuit, such as a VCSEL driver, which drives a laser, such as a VCSEL laser. However, it is to be appreciated that other lasers such as EMLs and DMLs may additionally or alternatively be utilized. In certain embodiments, the receiver 402 can receive input from a transimpedance amplifier (TIA) which receives input from a photodiode chip which converts an optical signal to an electrical signal. The optical signal received by the photodiode chip can be received, in one or more embodiments, from the transmitter 404. In one or more embodiments, the receiver 402 additionally includes a detector circuit used in the tuning process. In some embodiments, the detector circuit may be included as part of the CDR unit.

FIG. 5 is a flowchart illustrating an example method for tuning a transmitter based on symbol-error-rate in accordance with one or more embodiments of the present disclosure. It will be understood that each block of the flowcharts, and combinations of blocks in the flowcharts, may be implemented by various means. In some example embodiments, certain ones of the operations herein may be modified or further amplified as described below. Moreover, in some embodiments additional optional operations may also be included. It should be appreciated that each of the modifications, optional additions, or amplifications described herein may be included with the operations herein either alone or in combination with any others among the features described herein. The operations illustrated in FIG. 5 may, for example, be performed by an example computing system 600 (shown in FIG. 6) that is embedded in a communication system, such as a receiver (e.g., the receiver 402) in a communication system (e.g., the communication system 400). In some embodiments, the computing system 600 is a firmware computing system embedded in a receiver (e.g., the receiver 402) of a communication system (e.g., the communication system 400). In some embodiments, the computing system 600 is a hardware logic computing system (e.g., hardware logic circuitry). In one or more embodiments, the operations illustrated in FIG. 5 may, for example, be performed by a sequence selective symbol checker (e.g., the sequence selective symbol checker 410).

In one or more embodiments, at operation 502, the computing system 600 configures a symbol checker of a receiver with first binary sequence data generated by a symbol generator of the receiver. In an embodiment, the symbol checker can be a PRBS checker and the symbol generator can be a PRBS generator. In another embodiment, the symbol checker can be an SSPRQ checker and the symbol generator can be an SSPRQ generator.

In one or more embodiments, at operation 504, the computing system 600 compares, using the symbol checker, second binary sequence data provided by a transmitter to the first binary sequence data to generate error count data related to a number of errors for symbols associated with the second binary sequence data. For example, in one or more embodiments, the computing system 600 compares symbols of the second binary sequence data to symbols of the first binary sequence data using the symbol checker. In an embodiment, the first binary sequence data can correspond to an expected binary sequence for the second binary sequence data. Furthermore, in an embodiment, the second binary sequence data can be a pulse amplitude modulation signal (e.g., a PAM-4 signal). In certain embodiments, the transmitter can be a non-linear optical transmitter. Alternatively, in certain embodiments, the transmitter can be a non-linear electrical transmitter.

In one or more embodiments, at operation 506, the computing system 600 determines a total count data related to a number of symbols associated with the first binary sequence data. For example, in one or more embodiments, the computing system 600 monitors a current symbol of the first binary sequence data, a previous symbol of the first binary sequence data, and/or a future symbol of the first binary sequence data to facilitate determining the total count data.

In one or more embodiments, at operation 508, the computing system 600 determines error ratio data associated with the transmitter based on the error count data and the total count data. In an embodiment, the error ratio data can correspond to a symbol-error-rate for the second binary sequence data.

In certain embodiments, the computing system 600 additionally tunes the transmitter based on the error ratio data. In certain embodiments, the computing system 600 additionally tunes a look-up table of the transmitter based on the error ratio data. In certain embodiments, the computing system 600 additionally tunes (e.g., repeatedly tunes) the transmitter in response to a determination that the error ratio data satisfies a defined criterion. In certain embodiments, the computing system 600 additionally determines a number of error types for the symbol checker based on a type of coding for the second binary sequence data. In certain embodiments, the computing system 600 additionally synchronizes the first binary sequence data to the second binary sequence data based on a type of coding for the second binary sequence data.

FIG. 6 illustrates the computing system 600 that may be embedded in the communication system. In some cases, the computing system 600 may be a firmware computing system communicatively coupled with, and configured to control, one or more circuit modules in the communication system. For example, the computing system 600 may be a firmware computing system communicatively coupled with one or more circuit modules, such as the system 100 and/or the sequence selective symbol checker 410. The computing system 600 may include or otherwise be in communication with a processor 610, a memory circuitry 620, and communication circuitry 630. In some embodiments, the processor 610 (which may include multiple or co-processors or any other processing circuitry associated with the processor) may be in communication with the memory circuitry 620. The memory circuitry 620 may comprise non-transitory memory circuitry and may include one or more volatile and/or non-volatile memories. In some examples, the memory circuitry 620 may be an electronic storage device (e.g., a computer readable storage medium) configured to store data that may be retrievable by the processor 610. In some examples, the data stored in the memory 620 may include the error count 114, the total count 108, error ratio 202, the expected data 103, the observed data 105, or the like for enabling the apparatus to carry out various functions or methods in accordance with embodiments of the present invention, described herein.

In some examples, the processor 610 may be embodied in a number of different ways. For example, the processor may be embodied as one or more of various hardware processing means such as a microprocessor, a coprocessor, a digital signal processor (DSP), a controller, or a processing element with or without an accompanying DSP. The processor 610 may also be embodied in various other processing circuitry including integrated circuits such as, for example, an FPGA (field programmable gate array), a microcontroller unit (MCU), an ASIC (application specific integrated circuit), a hardware accelerator, or a special-purpose electronic chip. Furthermore, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining, and/or multi-threading. In some embodiments, the processor 610 is a microprocessor.

In an example embodiment, the processor 610 may be configured to execute instructions, such as computer program code or instructions, stored in the memory circuitry 620 or otherwise accessible to the processor 610. Alternatively or additionally, the processor 610 may be configured to execute hard-coded functionality. As such, whether configured by hardware or software instructions, or by a combination thereof, the processor 610 may represent a computing entity (e.g., physically embodied in circuitry) configured to perform operations according to an embodiment of the present invention described herein. For example, when the processor 610 is embodied as an ASIC, FPGA, or similar, the processor may be configured as hardware for conducting the operations of an embodiment of the invention. Alternatively, when the processor 610 is embodied to execute software or computer program instructions, the instructions may specifically configure the processor 610 to perform the algorithms and/or operations described herein when the instructions are executed. However, in some cases, the processor 610 may be a processor of a device (e.g., a mobile terminal or a fixed computing device) specifically configured to employ an embodiment of the present invention by further configuration of the processor using instructions for performing the algorithms and/or operations described herein. The processor 610 may further include a clock, an arithmetic logic unit (ALU) and logic gates configured to support operation of the processor 610, among other things.

The computing system 600 may optionally also include the communication circuitry 630. The communication circuitry may be any means embodied in either hardware or a combination of hardware and software that is configured to receive and/or transmit data from/to a network and/or any other device or module in communication with the computing system 600. In this regard, the communication interface may include, for example, supporting hardware and/or software for enabling communications. As such, for example, the communication circuitry 630 may include a communication modem and/or other hardware/software for supporting communication via cable, universal serial bus (USB), integrated circuit receiver, or other mechanisms.

FIG. 7 illustrates an example eye diagram 700 related to one or more embodiments disclosed herein. For example, the eye diagram 700 can be an eye diagram for a signal transmitted via the channel 406. In one example, a first eye of the eye diagram 700 can be associated with a first triplet (e.g., {0,2,3}) and a second eye of the eye diagram 700 can be associated with a second triplet (e.g., {0,1,3}). In certain embodiments, an eye of an eye diagram such as, for example, the eye diagram 700, can be employed to determine one or more symbols (e.g., a symbol sequence) for the observed data 105.

Many modifications and other embodiments of the present inventions set forth herein will come to mind to one skilled in the art to which these inventions pertain having the benefit of the teachings presented in the foregoing descriptions and the associated drawings. Therefore, it is to be understood that the present inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method for tuning based on symbol-error-rate, comprising:
configuring a symbol checker of a receiver with first binary sequence data generated by a symbol generator of the receiver;

comparing, using the symbol checker, second binary sequence data provided by a transmitter to the first binary sequence data to generate error count data related to a number of errors for symbols associated with the second binary sequence data;

determining total count data related to a number of symbols associated with the first binary sequence data;

determining error ratio data associated with the transmitter based on the error count data and the total count data; and repeatedly tuning the transmitter in response to a determination that the error ratio data satisfies a defined criterion.

2. The method of claim 1, wherein comparing the second binary sequence data to the first binary sequence data comprises comparing symbols of the second binary sequence data to symbols of the first binary sequence data using the symbol checker.

3. The method of claim 1, further comprising:
tuning a look-up table of the transmitter based on the error ratio data.

4. The method of claim 1, further comprising:
determining a number of error types for the symbol checker based on a type of coding for the second binary sequence data.

5. The method of claim 1, further comprising:
synchronizing the first binary sequence data to the second binary sequence data based on a type of coding for the second binary sequence data.

6. The method of claim 1, wherein determining the total count data comprises monitoring at least a current symbol of the first binary sequence data, a previous symbol of the first binary sequence data, and a future symbol of the first binary sequence data.

7. The method of claim 1, wherein the first binary sequence data corresponds to an expected binary sequence for the second binary sequence data.

8. The method of claim 1, wherein the error ratio data corresponds to a symbol-error-rate for the second binary sequence data.

9. The method of claim 1, wherein the second binary sequence data is a pulse amplitude modulation signal.

10. The method of claim 1, wherein the transmitter is a non-linear optical transmitter or a non-linear electrical transmitter.

11. An apparatus in a receiver comprising at least one processor and at least one memory including computer program code, the at least one memory and the computer program code configured to, with the at least one processor:
configure a symbol checker of the receiver with first binary sequence data generated by a symbol generator of the receiver;
compare, based on the symbol checker, second binary sequence data provided by a transmitter to the first binary sequence data to generate error count data related to a number of errors for symbols associated with the second binary sequence data;
determine total count data related to a number of symbols associated with the first binary sequence data;
determine error ratio data associated with the transmitter based on the error count data and the total count data; and
repeatedly tune the transmitter in response to a determination that the error ratio data satisfies a defined criterion.

12. The apparatus of claim 11, wherein the at least one memory and the computer program code are further configured to:
compare symbols of the second binary sequence data to symbols of the first binary sequence data using the symbol checker.

13. The apparatus of claim 11, wherein the at least one memory and the computer program code are further configured to:
tune a look-up table of the transmitter based on the error ratio data.

14. The apparatus of claim 11, wherein the at least one memory and the computer program code are further configured to:
determine a number of error types for the symbol checker based on a type of coding for the second binary sequence data.

15. The apparatus of claim 11, wherein the at least one memory and the computer program code are further configured to:
synchronize the first binary sequence data to the second binary sequence data based on a type of coding for the second binary sequence data.

16. The apparatus of claim 11, wherein the second binary sequence data is a pulse amplitude modulation signal.

17. An apparatus in a receiver comprising hardware logic circuitry configured to:
configure a symbol checker of the receiver with first binary sequence data generated by a symbol generator of the receiver;
compare, based on the symbol checker, second binary sequence data provided by a transmitter to the first binary sequence data to generate error count data related to a number of errors for symbols associated with the second binary sequence data;
determine total count data related to a number of symbols associated with the first binary sequence data;
determine error ratio data associated with the transmitter based on the error count data and the total count data; and
repeatedly tune the transmitter in response to a determination that the error ratio data satisfies a defined criterion.

18. The apparatus of claim 17, wherein the hardware logic circuitry is further configured to:
tune a look-up table of the transmitter based on the error ratio data.

19. The apparatus of claim 17, wherein the hardware logic circuitry is further configured to:
determine a number of error types for the symbol checker based on a type of coding for the second binary sequence data.

20. The apparatus of claim 17, wherein the hardware logic circuitry is further configured to:
synchronize the first binary sequence data to the second binary sequence data based on a type of coding for the second binary sequence data.

21. A method for tuning based on symbol-error-rate, comprising:
configuring a symbol checker of a receiver with first binary sequence data generated by a symbol generator of the receiver;
synchronizing the first binary sequence data to second binary sequence data provided by a transmitter based on a type of coding for the second binary sequence data;

comparing, using the symbol checker, the second binary sequence data to the first binary sequence data to generate error count data related to a number of errors for symbols associated with the second binary sequence data;

determining total count data related to a number of symbols associated with the first binary sequence data; and determining error ratio data associated with the transmitter based on the error count data and the total count data.

22. The method of claim 21, further comprising:
tuning the transmitter based on the error ratio data.

23. The method of claim 21, further comprising:
tuning a look-up table of the transmitter based on the error ratio data.

* * * * *